Feb. 8, 1938. A. N. PORTER 2,107,499
STIRRUP BEARING FOR PITMANS
Filed Nov. 4, 1936
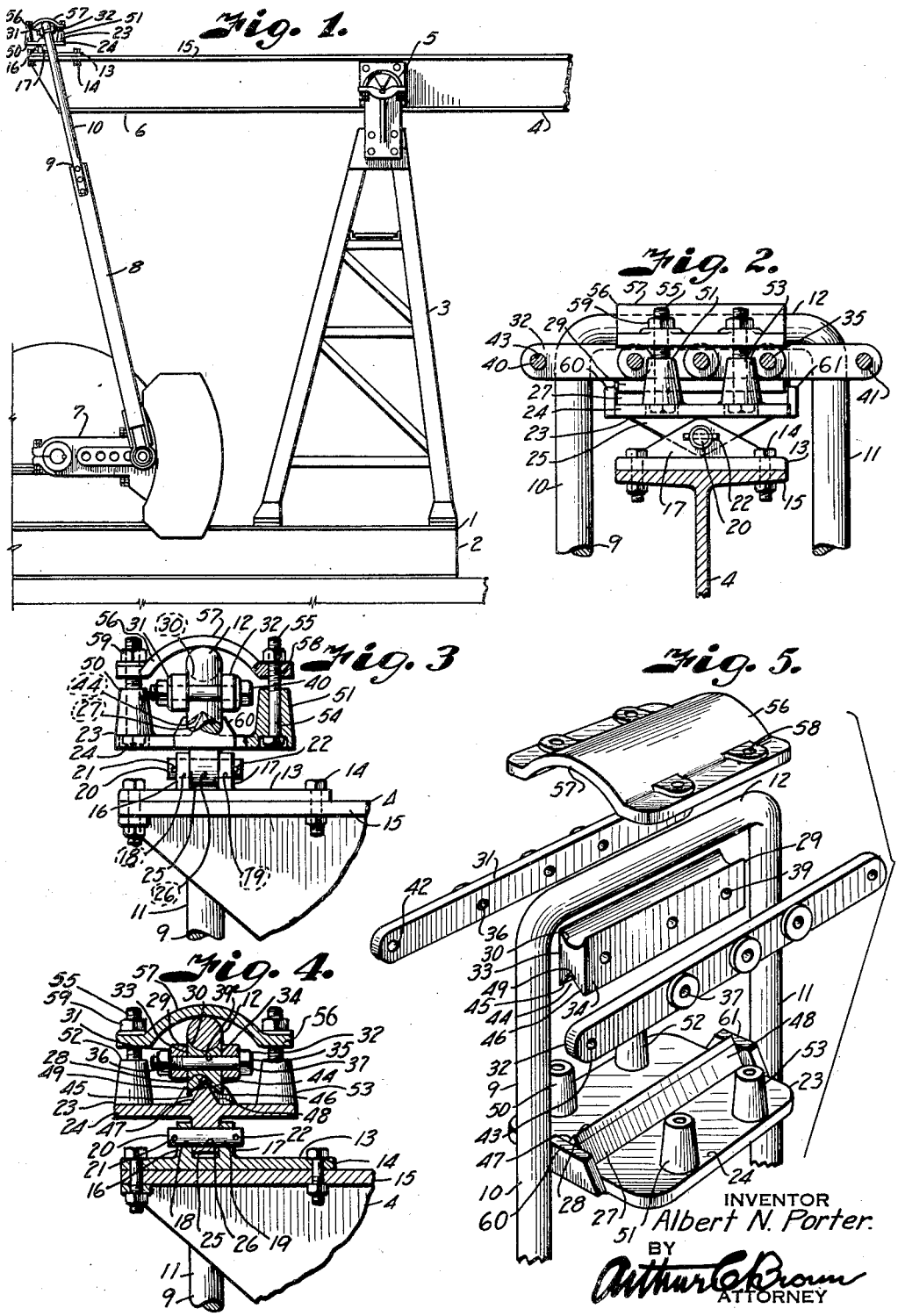
INVENTOR
Albert N. Porter.
BY
Arthur C. Brown
ATTORNEY Patented Feb. 8, 1938

2,107,499

UNITED STATES PATENT OFFICE 2,107,499

STIRRUP BEARING FOR PITMANS

Albert N. Porter, Tulsa, Okla., assignor to J. F. Darby, Tulsa, Okla.

Application November 4, 1936, Serial No. 109,114

4 Claims. (Cl. 308—21)

This invention relates to stirrup bearings particularly for connecting a pitman to a walking beam or similar rocking member, such as used in oil well pumping rigs, and has for its principal object to provide a bearing of this character which does not require lubrication.

Other important objects of the invention are to provide a stirrup bearing that is free to adjust itself for any misalignment of the pitman relative to the walking beam; to provide a knife edge bearing constructed to eliminate play incidental to reciprocating thrusts of the pitman; and to provide a bearing that is readily adaptable to a standard pitman stirrup.

In accomplishing these and other objects of the invention, I have provided improved details of structure, the preferred forms of which are illustrated in the accompanying drawing, wherein:

Fig. 1 is a side elevational view of a portion of a pumping rig equipped with a stirrup bearing embodying the features of the present invention.

Fig. 2 is an enlarged end elevation of the stirrup bearing, part of the walking beam being shown in section.

Fig. 3 is a side elevational view of the bearing, a part of the stirrup being broken away to better illustrate the rocking mounting of the fulcrum member, and showing a part of the bearing members in section to better illustrate their construction.

Fig. 4 is a vertical section through the bearing stirrup and part of the walking beam.

Fig. 5 is a detail perspective view of the parts of the bearing and a portion of the stirrup shown in disassembled spaced relation.

Referring more in detail to the drawing:

1 designates a conventional pumping rig which includes a base 2 supporting a samson-post 3 on which is pivotally mounted a walking beam 4 by means of a saddle type bearing 5. One end of the walking beam is connected to the sucker rods of a pumping apparatus (not shown), and the other end 6 to a crank arm 7 by a pitman 8 to effect oscillation of the beam. The pitman 8 is connected with the walking beam through a stirrup 9 having side bar portions 10 and 11 connected at their upper ends by a cross bar 12 that is pivotally connected with the end of the beam as shown in Fig. 1.

The pivotal connection of the stirrup with the walking beam ordinarily requires lubrication because of the sliding contact of the cross bar of the stirrup within its bearing connection. This lubrication is difficult to maintain for the reason that the attendant must climb to the top of the samson-post and walk along the narrow edge of the beam to reach the bearing. Since the walking beam is ordinarily carried at a considerable height from the ground this is a hazardous operation with the result that the bearings are neglected and do not receive adequate lubrication.

As above pointed out, it is the principal object of the present invention to provide a bearing so constructed that it does not require lubrication and which will operate for indefinite periods without replacement of any of the parts, as now to be described.

Mounted on the upper face of the beam is a bearing anchoring plate 13 that is secured thereto by fastening devices, such as bolts 14 extending through suitable openings in the plate and through aligning openings in the lateral flanges 15 of the walking beam. Extending transversely of the plate and preferably formed as an integral part thereof are spaced triangular shaped ribs 16 and 17 having openings 18 and 19 located in alignment with the longitudinal median line of the beam to mount a pivot pin 20 which is retained therein by keys 21 and 22 extending through the ends of the pin and engaging the outer sides of the respective ribs.

Pivotally mounted on the pin for rocking movement transversely of the beam is a fulcrum member 23 including a plate 24 having a depending triangular shaped rib 25 provided with a bearing opening 26 to receive the portion of the pin 20 extending between the triangular shaped ribs of the anchoring plate. Extending transversely across the upper surface of the fulcrum plate at the center thereof and preferably integral therewith is a fulcrum 27 having substantially V-shaped cross-section to form a knife edge bearing portion 28 that is preferably formed of wear resisting material welded into the apical portion of the fulcrum.

Secured to the cross bar portion 12 of the stirrup is a seating member 29 including a bar having substantially the same thickness as the diameter of the side members of the stirrup and which has its upper edge provided with a groove-like seat 30 for seating the cross bar of the stirrup. The seating member is rigidly connected with the stirrup by clamping bars 31 and 32 attached to the side faces 33 and 34 of the seating member by fastening devices such as bolts 35 extending through openings 36 and 37 in the bars and through aligning openings 39 in the seating member, as best shown in Fig. 4. The ends of the bars project beyond the sides of the stirrup and are clamped against the vertical bar portions 10 and 11 by bolts 40 and 41 extending through openings 42 and 43 in the ends of the bars. It is thus obvious that when the nuts of the bolts are drawn tight the seat member is securely retained in fixed relation with the cross bar of the stirrup.

Formed in the under face of the seating member is a substantially V-shaped groove 44 of greater angle than that of the fulcrum so that the converging side faces 45 and 46 thereof are spaced from the corresponding side faces 47 and 48 of the fulcrum when the seating member is mounted on the knife edge of the fulcrum, as best shown in Fig. 4, to provide swinging movement of the stirrup relatively to the beam. The contacting portion of the groove 44 with the knife edge is preferably provided with a wear resisting insert 49 that may be welded into the base of the groove as shown in Fig. 4. The seating member will ordinarily retain its engagement with the knife edge of the fulcrum when the pitman is moved in a downward direction to raise the forward end of the pitman, and the weight of the rods and well fluid normally retain the knife edge in proper engagement with the fulcrum member when the pitman moves in the opposite direction, but there is a tendency for the seating member to leave the fulcrum member during the time the pitman is reversing its stroke. I therefore provide the plate 24 with pairs of spaced bosses 50—51 and 52—53 located on the opposite sides of the fulcrum and which are provided with bores 54 to mount bolts 55 for securing a cap member 56 that extends over the cross bar of the stirrup.

The cap member 56 includes an arcuate plate portion 57 having a radius of curvature generated from the knife edge of the fulcrum so as to allow oscillating movement of the stirrup during pivotal movement of the seat member on the knife edge. The ends of the arcuate portion of the plate terminate in radial flanges overlying the pairs of bosses and are provided with openings 58 to pass the bolts 55 as shown in Fig. 3, the cap being secured in position on the bolts by nuts 59 that are threaded on the studs to engage the flanges of the cap. In order to prevent lateral shifting of the seating member, the sides of the fulcrum plate are provided with stop wings 60 and 61 that extend above and to the sides of the fulcrum.

In assembling the bearing constructed as described, the fulcrum member is pivoted on the anchoring plate and the anchoring plate is attached to the walking beam by the fastening devices 14. The seating member is then secured to the stirrup by the clamping bars 31 and 32. The stirrup is then swung over the end of the beam to engage the seating member with the knife edge of the fulcrum. The bolts 55 are then inserted into the bosses and the retaining cap is passed thereover to engage the cross bar 12 after which the nuts 59 are applied to complete the assembly. Upon rotation of the crank 7 the pitman is reciprocated to rock the beam as in conventional practice. The stirrup, however, pivots on the knife edge of the fulcrum with the cross bar 12 thereof swinging in an arc under the arc shaped portion of the cap. No lubrication is required since there is no sliding movement of the seating member on the fulcrum. The contact of the cross bar with the retaining cap also requires no lubricant since it in no way sustains the loads imparted to the beam. In case the walking beam should not align directly with the crank arm the fulcrum member is free to pivot in a lateral direction on the pin 22 to prevent binding of the stirrup bearing.

From the foregoing it is obvious that I have provided a bearing construction which does not require lubrication and which eliminates most of the friction normally present in the conventional stirrup bearing.

What I claim and desire to secure by Letters Patent is:

1. In combination with an oscillatory member and an actuating pitman having a stirrup through which a portion of the oscillatory member extends and provided with a cross bar portion extending across the oscillatory member, a bearing member mounted on the oscillatory member, a bearing member having a groove for seating the cross bar portion of the stirrup, means rigidly clamping the last named bearing member to the stirrup, a knife edge bearing on one of said members and pivotally engaged with the other bearing member, said knife edge bearing extending in parallel relation with the cross bar portion of the stirrup, and means for retaining said knife edge bearing in pivotal engagement.

2. In combination with an oscillatory member and a pitman having a stirrup provided with cross bar and side portions, a bearing member mounted on the oscillatory member, a bearing member having a groove for seating the cross bar portion of the stirrup, clamping bars extending along the sides of the bearing member and overlying said side bar portions of the stirrup, fastening devices connecting the clamping bars for rigidly clamping said bearing member to the stirrup, and a knife edge bearing on one of said members and pivotally engaged with the other bearing member.

3. In combination with an oscillatory member and a pitman having a stirrup provided with cross bar and side portions, a bearing member mounted on the oscillatory member, a bearing member having a groove for seating the cross bar portion of the stirrup, clamping bars extending along the sides of the bearing member and overlying said side bar portions of the stirrup, fastening devices connecting the clamping bars for rigidly clamping said bearing member to the stirrup, a knife edge bearing on one of said members and pivotally engaged with the other bearing member, and arcuate guide means fixed to the bearing member mounted on the oscillatory member and having engagement with the cross bar portion of the stirrup for retaining the knife edge bearing in said pivotal engagement.

4. In combination with an oscillatory member and an actuating pitman having a stirrup provided with a cross bar and side bar portions respectively extending across the top and over the sides of the oscillatory member, a bearing member inset between the side bar portions and having a seat for the cross bar portion of the stirrup, a cooperating bearing member fixed to the oscillatory member, means rigidly clamping the first named bearing member to the side bar portions of the stirrup to retain the cross bar portion in rigid engagement with said seat, and a knife edge bearing on one of the bearing members pivotally engaging with the other bearing member with the knife edge bearing extending in parallel relation with the cross bar portion of said stirrup.

ALBERT N. PORTER.